Figure 1:
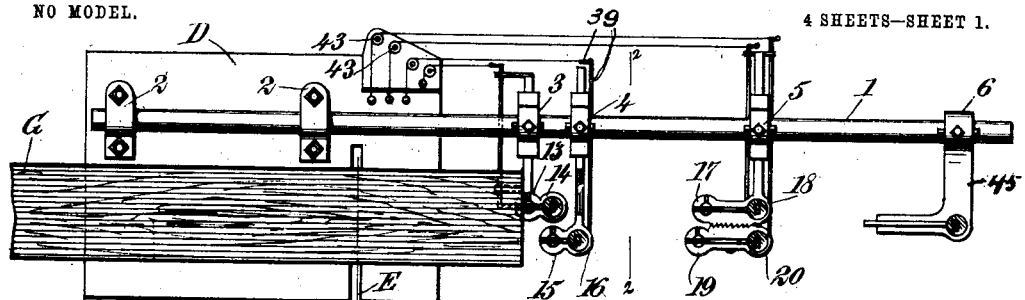

No. 741,479. PATENTED OCT. 13, 1903.
H. O. FRY.
GAGING AND COUNTING ATTACHMENT FOR WOODWORKING MACHINES.
APPLICATION FILED MAR. 6, 1903.
NO MODEL. 4 SHEETS—SHEET 1.

WITNESSES:
Johua Bengshan
R. B. Cavanagh

INVENTOR
Henry O. Fry
BY
ATTORNEYS.

No. 741,479. PATENTED OCT. 13, 1903.
H. O. FRY.
GAGING AND COUNTING ATTACHMENT FOR WOODWORKING MACHINES.
APPLICATION FILED MAR. 6, 1903.
NO MODEL. 4 SHEETS—SHEET 2.

WITNESSES:
Joshua Bengston
R. B. Cavanagh

INVENTOR
Henry O. Fry
BY Munn
ATTORNEYS.

No. 741,479. PATENTED OCT. 13, 1903.
H. O. FRY.
GAGING AND COUNTING ATTACHMENT FOR WOODWORKING MACHINES.
APPLICATION FILED MAR. 6, 1903.
NO MODEL. 4 SHEETS—SHEET 3.
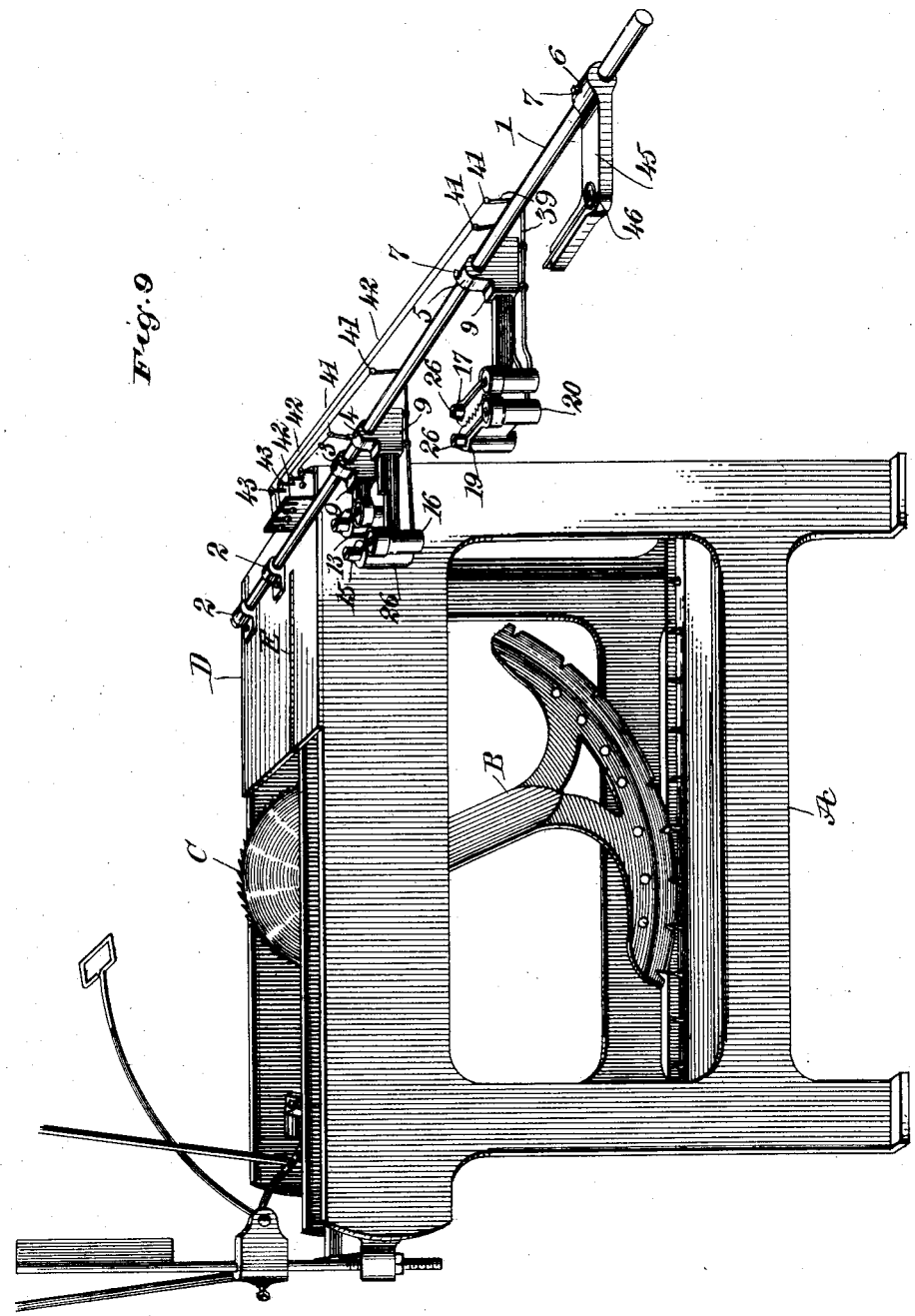
WITNESSES:
INVENTOR
Henry O. Fry
BY
ATTORNEYS.

No. 741,479. PATENTED OCT. 13, 1903.
H. O. FRY.
GAGING AND COUNTING ATTACHMENT FOR WOODWORKING MACHINES.
APPLICATION FILED MAR. 6, 1903.
NO MODEL. 4 SHEETS—SHEET 4.
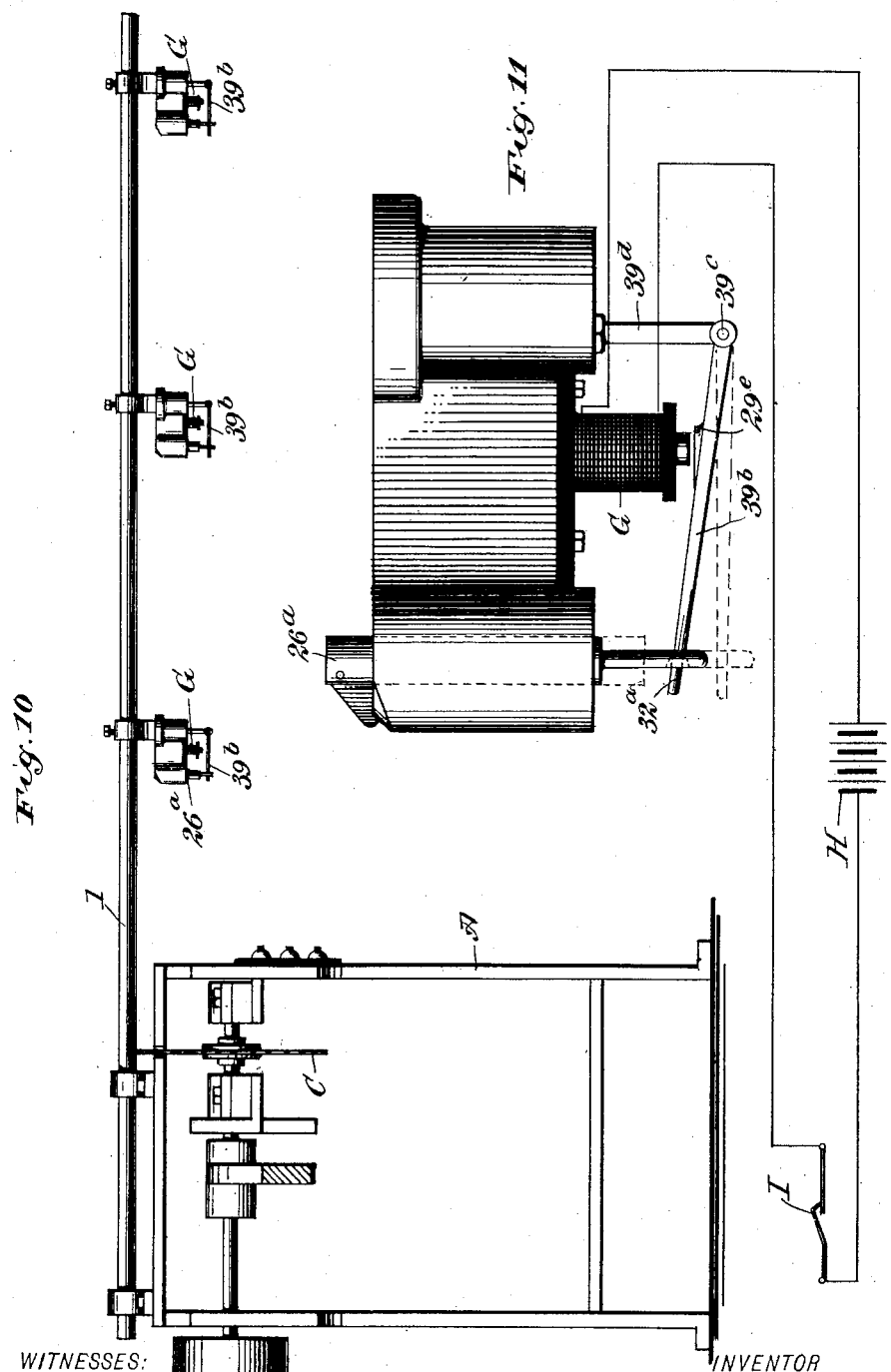
WITNESSES:
INVENTOR
Henry O. Fry
BY
ATTORNEYS.

No. 741,479. Patented October 13, 1903.

UNITED STATES PATENT OFFICE.

HENRY OSCAR FRY, OF COSMOPOLIS, WASHINGTON, ASSIGNOR OF ONE-HALF TO ENOCH A. SLOVER, OF PORTLAND, OREGON.

GAGING AND COUNTING ATTACHMENT FOR WOODWORKING-MACHINES.

SPECIFICATION forming part of Letters Patent No. 741,479, dated October 13, 1903.

Application filed March 6, 1903. Serial No. 146,482. (No model.)

*To all whom it may concern:*

Be it known that I, HENRY OSCAR FRY, a citizen of the United States, and a resident of Cosmopolis, in the county of Chehalis and State of Washington, have invented new and useful Improvements in Gaging and Counting Attachments for Woodworking-Machines, of which the following is a full, clear, and exact description.

My invention relates to certain novel and useful improvements in gaging and counting attachments for woodworking-machines, and has particular application to a mechanism of the type described adapted to be used in conjunction with sawing-machines for cutting off different lengths of stock used in the manufacture of boxes, blinds, furniture, and the like.

Primarily I have in view the provision of a mechanism such as above referred to which may be applied to any sawing-machine and shall gage each and every piece of stock cut to the exact length desired and at the same time will keep an accurate account of the number of pieces so cut.

A further object of my invention is to so construct the mechanism above described that parts thereof may be adjusted easily and quickly to cut the length of stock wanted, and the machine is further so arranged that any number of lengths may be gaged without changing or resetting the device and each and every piece of stock cut may be counted as it is severed by the saw. I have also in contemplation the provision of means attached to my improvement whereby the latter may be caused to perform its gaging function without actuating the counting mechanism thereof.

Another object of my invention is to provide a counting and gaging attachment for woodworking-machines which shall be exceedingly simple in construction, positive in its operation, durable, and one which may be quickly attached to any wood-sawing machine commonly used for cutting off stock for boxes and the like.

With these and other objects of a similar nature in view my invention consists in the construction, combination, and arrangement of parts, as is hereinafter described in this specification, delineated in the accompanying drawings, and set forth in the appended claims.

Reference is to be had to the accompanying drawings, forming a part of this specification, in which similar characters of reference indicate corresponding parts in all the figures.

Figure 2:
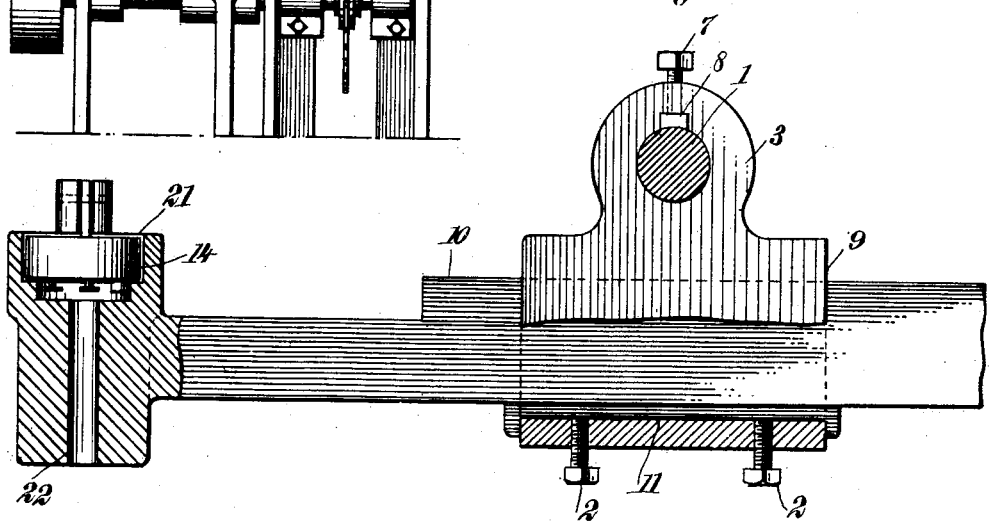
Figure 3:
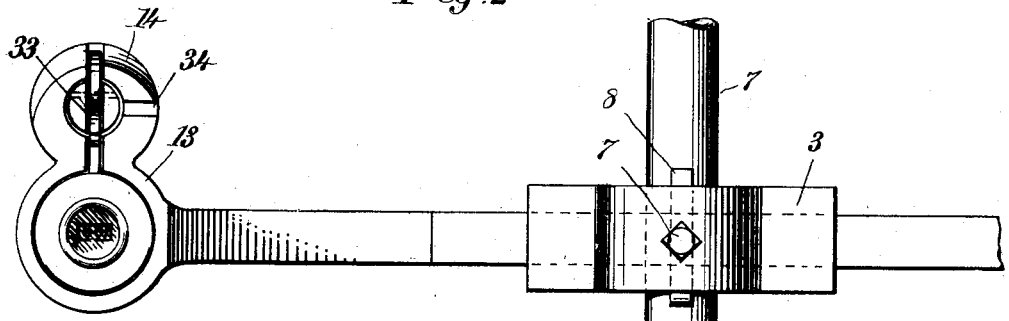
Figure 4:
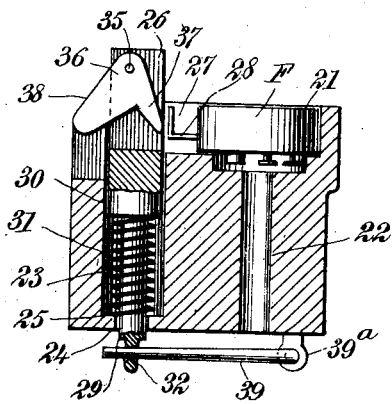
Figure 5:
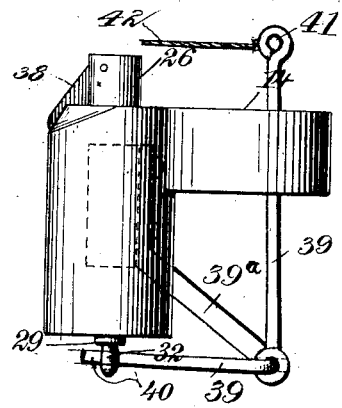
Figure 6:
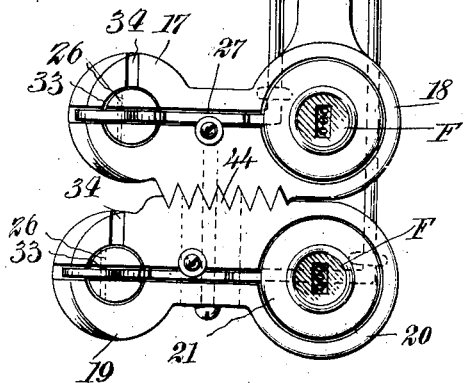
Figures 7, 8:
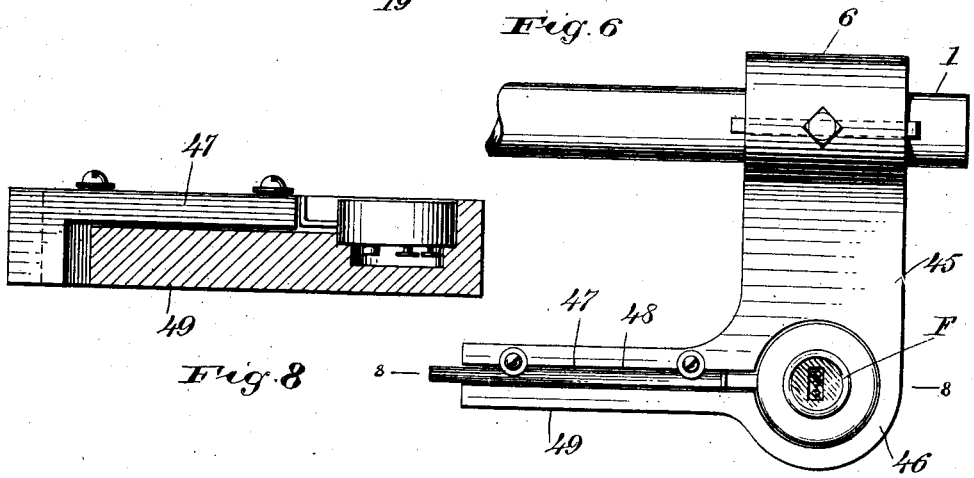

Figure 1 is a top plan view of a wood-sawing machine of an ordinary and well-known type, showing my improvements applied thereto. Fig. 2 is a sectional view taken longitudinally through one of the gaging and counting members substantially on the line 2 2 of Fig. 1. Fig. 3 is a top plan view of one of the gaging and counting members, showing the same attached to a portion of the main support. Fig. 4 is a vertical sectional view of the gaging and counting attachment of my improvement. Fig. 5 is a view in side elevation of the gaging and counting attachment of the device and showing the levers employed for raising and lowering the gaging means. Fig. 6 is a top plan view of one of the members which is formed of two sections, each provided with a counting and gaging device, said two sections being adjustable relatively to each other. Fig. 7 is a top plan view of another form of counting attachment used in carrying out my invention. Fig. 8 is a sectional view taken on the line 8 8 of Fig. 7. Fig. 9 is a perspective view of a wood-sawing machine having my improvements applied thereto. Fig. 10 is an end view of a machine partially illustrating means for electrically operating the gaging-pins, and Fig. 11 is an enlarged detail view of the electrical apparatus for operating the gage-pins.

In the accompanying drawings, and particularly in Figs. 1 and 9 thereof, I have shown the manner of applying my improvement to a wood-sawing machine of an ordinary and well-known form. In the present instance Fig. 9 shows a sawing-machine of the type commonly known as a "rocker cut-off saw" and comprises, essentially, the frame A, having the rocker-arm B and the circular or cutting disk C. The machine is provided with the usual cutting-knives and lever attached for shifting the same; but as they form no part of the present invention it is unnecessary to enter into detailed description thereof. The aforesaid frame A is provided with a table or top portion D, having a slot E therein, in which slot is adapted to travel the cutting-disk C when the latter is moved toward the forward end of the frame, it being, of course, understood that when in operation the cutting-disk C moves to and fro across the table or frame.

Extending transversely across the top or table portion D of the frame is a rod or shaft 1, which is bolted or held rigidly in position on said top by means of the clamping arms or attachments 2 2. This shaft extends for a considerable distance beyond the side of the frame and is also mounted adjacent to the end of the slot E—that is, at a point near the limit of the extreme forward motion of the cutting-disk. On this horizontally-extending shaft 1 are mounted a number of brackets, as 3, 4, 5, and 6, which are held in any desired position of adjustment longitudinally of said shaft through the medium of the set-screw 7 and a bearing-block 8, as will be clearly seen in Fig. 2. Each of these arms or brackets 3, 4, and 5 is provided with a sleeve-like portion, as shown at 9, which is adapted to retain or support the arms, as at 10, said arms or members being held adjustable in said bracket portions 9 through the medium of the bearing-pin 11 and the set-screw 2 as will be clearly shown in Fig. 2. At the end of said arms extending inwardly toward the frame are mounted a number of counting engaging devices, which I will now proceed to describe in detail.

The aforesaid arms 10 10 are formed at their opposite extremities with a number of enlarged recessed head portions, which consist in the present instance of two approximately cylindrical members, as at 13 and 14 and 15 and 16, attached to the brackets 3 and 4, respectively, and these aforesaid tubular or cylindrical members are duplicated at the end of the arm 5, as shown at 17, 18, 19, and 20 in Figs. 1 and 9. It will thus be seen that I have provided a pair of such cylindrical head portions for each arm, and one of said head portions of the pair is provided with a hollowed-out portion or seat 21, adapted to receive a counting mechanism of any desired type, such as shown at F. A bore or passage-way 22 extends from the bottom of said seat vertically through the member. The adjoining cylindrical portion of the head is provided with a vertical longitudinal bore, as at 23, the lower portion of said bore being reduced, as at 24, whereby a shoulder 25 is formed, such bore or passage-way being adapted to receive and form a seat for the stop or gage pin 26. A transverse slot 27 communicates with the seat 21 and the bore 23, thereby permitting the tripping or actuating of the counting mechanism through means on the gage-pin 26. The coöperation between the counting mechanism and said pin I will now proceed to describe in detail.

The aforesaid counting mechanism is provided with a tripping or actuating pin or slide 28, which when the said counting mechanism is in its seat extends or lies in the passage-way 27. The gage-pin 26 consists, essentially, of an enlarged or head portion and a reduced shank portion, said shank portion being designated by the numeral 29. Between the shoulder 30, formed at the junction of the head portion of the member and the shoulder 24 at the base of the bore or passage 23, is interposed a spring 31, said spring being preferably coiled about the said reduced shank portion. It will be further observed that the aforesaid shank extends entirely through the bore 23 and is provided at its extremity with an eye or aperture, as at 32. The aforesaid pin is provided with a slot, as at 33, and the head portion or member in which the pin is seated has a short slot 34, the aforesaid slot 33 extending across the head of the pin. Between the walls forming this slot 33 is pivotally held, by means of the pin 35, a cam 36, having the angular arms 37 and 38, the arm 37 extending through the slot to a point contiguous to the trip 28 of the counting mechanism, the arm 38 extending through the slot in the opposite direction.

As will be evident upon examination of Figs. 4 and 5, the gaging-pins normally extend above the upper surface of the head portions wherein they are seated, being held in such elevated position by means of the tension-spring 31, hereinbefore described; but should it be desired for any reason to bring one of the pins below the surface of said head portion—that is, to throw said pin out of its operative position—this may be accomplished by means of the crank-lever 39, which has one end, as at 40, extended through the eye 32 at the end of the shank portion of the pin, while the other end of the crank-lever is provided with an eye 41, to which is attached a cord 42, which cord leads and is attached to a key or stop 43 under control of the operator of the machine, said key 43 being mounted on a keyboard on the table or top of the frame. The aforesaid lever 39 is supported through the medium of a bracket 39ª, as clearly shown in Fig. 5. While I have in referring to this arrangement for the sake of convenience described the operation of but one pin or stud, it is of course to be understood that the same is applicable to all similar gaging-pins of the device and that the lever, attaching-cord, and other parts are applied to each and every one of the pins, so that such pins may be operated individually one at a time or the entire series of pins may be actuated simultaneously. It will further be seen that the head portions at the end of the arms 10 are duplicated and have intermeshing serrated or toothed edges 44. One of said sections of this head portion—for instance, the outer section—is provided with an elongated slot or bore extending transversely therethrough, as is shown in dotted lines in Fig. 6, the shank of a screw-bolt, as at 44ª, passing through said slot and into a bore or recess in the adjoining section, the construction being such that when the screw-bolt 44ª is loosened the outer member may be moved or shifted relative to the inner member, and when the bolt is again tightened said members will be held securely in their adjusted positions. By the arrangement herein shown and described an accurate and minute adjustment is attained for cutting off very small pieces of stock. The outermost bracket, as at 6 on the shaft 1, is provided with an angular-shaped arm 45, having a counter situated in the bend or angle 46 of said arm, the trip slide or pin of the counting mechanism in this case being actuated by a rod or bar 37, lying in the slot 48 of the member 49 of said arm. In this instance the member 49 acts as a gage-stop for the board, and it is therefore unnecessary to use the spring-pressed pins hereinbefore described.

From the above description, taken in connection with the drawings, the operation of my improvement will be readily apparent. The stock or board to be cut, being represented by the letter G in Fig. 1, is moved or placed across the frame-top in such manner as to be directly in the path of the saw, and such board is further tilted or moved so as to press against the arm 38 of the cam 36 of any desired pin, which will cause said cam to be moved on its pivot outward, the heel or opposite arm 37 thereof contacting with and actuating the trip slide or pin 28 of the counter. The edge of the board will then rest against the pin, and the saw running through will cut off the predetermined length of stock. As hereinbefore stated, the brackets carrying the arms of the gages and counters may be moved and held in any adjusted position longitudinally of the shaft or rod to cut off a board of predetermined length, and the arms resting in said brackets may also be moved to any position transversely of said path.

By my improvement an extremely fine adjustment may be attained—that is to say, a board may be cut off to any predetermined length no matter how small, and, if desired, the rod may be graduated or scaled to indicate the measurement thereon.

The pins or gages may be operated automatically—that is to say, without employing the wire attachments—as the stock or board will press down those pins that are nearer the saw than the one that acts as the operating-gage or abutting pin; but when cutting off very short lengths of stock—as, for instance, a piece one-sixteenth of an inch—it will be found desirable to use the wire and lever attachments, as the board or stock in pressing down a pin which it is not desired to use, but which is very close to the pin to be employed, might also affect the latter pin. The same attachment, however, may be used in a slightly different manner by removing the coiled spiral springs from the shank of the gaging-pin, which will permit such pins to rest normally below the surface, and they may then be raised and adjusted, if desired, one at a time as the occasion requires. There are numerous other ways in which these pins may be adjusted or operated in addition to the keyboard, the cables, and the wire rods or levers described, and such modifications will immediately suggest themselves to those skilled in the art.

In many instance it will be more convenient and economical to operate the gage-pins through the medium of an electrical apparatus, such as is shown in Figs. 10 and 11. In such case the gage-pin 26ª has a lever-rod 39ᵇ bearing at its free end in the eyepiece 32ª of the pin, the opposite end of said lever being pivoted, as at 39ᶜ, to a vertically-depending rod 39ᵈ.

An electromagnet, as at G, is mounted beneath the frame of the gage-pin and is in circuit with a suitable battery H, the electrical circuit being made or broken at the contact-points I. When the magnet is energized, it is adapted to attract the arm 39ᵇ at the point 29ᵉ, and consequently elevate the pin into the position shown in full lines in Fig. 11. When the circuit is broken, the pin will drop to the position shown in dotted lines in said Fig. 11.

While I have shown and herein described the preferred embodiment of my invention, I wish it to be understood that I do not limit myself to the precise details of construction herein, as there may be modifications and variations in some respects without departing from the spirit of the invention or sacrificing any of the advantages thereof.

Having thus described my invention, I claim as new and desire to secure by Letters Patent—

1. The combination of a main frame, a supporting-rod secured to said frame, a bracket adapted to be adjustable transversely of said rod, an arm carried by the bracket and adjustable therein, said arm having a recess, a pin movable in said recess, and means operated from the frame for drawing the pin into the recess, substantially as set forth.

2. In combination with a wood-sawing machine, of a shaft or rod secured thereto, gaging devices and counting mechanisms mounted on said shaft, and means on the gaging devices for operating the counting mechanisms, substantially as set forth.

3. The combination with a main frame, of counting mechanisms and gaging devices mounted on said frame, means for actuating the counting mechanisms from the gaging devices, and means for holding said counting mechanisms and gaging devices in a position of adjustment relatively to said main frame, substantially as set forth.

4. The combination with a main frame, of counting mechanisms and gaging devices mounted on said frame, means carried by said gaging devices for actuating the counting mechanisms, means for holding said counting mechanisms and gaging devices in an adjusted position transversely of said frame, and means for holding the counting mechanisms and gaging devices in an adjusted position longitudinally of said frame, substantially as set forth.

5. The combination with the main frame of a sawing-machine, of a shaft mounted on said frame, counting mechanisms and gaging devices, means pivoted to the gaging devices for operating the counting mechanisms, means for holding said counting mechanisms and gaging devices in an adjusted position on said shaft, and means for actuating said gaging devices independently of the counting mechanisms, substantially as set forth.

6. The combination with the main frame of a sawing-machine, of a shaft mounted thereon, counting mechanisms and gaging devices carried by said shaft, means for holding said mechanisms and devices in a position of adjustment on said shaft, means for actuating said counting mechanisms through the movement of the gaging devices, and means for operating said gaging devices independently of the counting mechanisms, substantially as set forth.

7. The combination of a main frame, counting mechanisms and gaging devices supported thereon, cam devices secured to the gaging devices and designed to operate the counting mechanisms when the stock is passing through the machine, and means for actuating the gaging devices independently of the counting mechanisms, substantially as set forth.

8. The combination with a main frame, of a shaft carried by said frame, counting mechanisms and gaging devices supported from said shaft, means on the gaging devices adapted to contact with and operate the counting mechanisms, and means mounted on the main frame and connected with the gaging devices for moving the latter independently of the counting mechanisms, substantially as set forth.

9. In combination with the main frame of a sawing-machine, of gaging devices and counting mechanisms carried by said frame, means for holding the counting mechanisms and gaging devices in an adjusted position relatively to said frame, means carried by the gaging devices for actuating the counting mechanisms, and means for moving said gaging devices vertically, substantially as set forth.

10. In combination with the frame of a sawing-machine, of a gaging device and counting mechanism carried thereby, and a cam carried by the gaging device, adapted to contact with and operate the counting mechanism when said cam is actuated through the medium of the stock or work passing through the machine, substantially as set forth.

11. In combination with the main frame of a sawing-machine, of a shaft carried thereby, a series of brackets adjustably mounted on said shaft, arms carried by said brackets, gaging devices and counting mechanisms supported by said arms, and means carried by the gaging devices and contacting with the counting mechanisms, for actuating the latter when the last-mentioned means is operated by the stock or work passing through the machine, substantially as set forth.

12. A counting and gaging attachment for sawing-machines, comprising a counting mechanism, a gaging-pin mounted adjacent to said counting mechanism, and means pivotally mounted on said gaging-pin and contacting with the counting mechanism, for moving the latter when said pivoted means on the gaging-pin is actuated, substantially as set forth.

13. A counting and gaging attachment for sawing-machines, comprising an adjustable support, a counting mechanism carried by said support, a spring-tensioned stud or pin mounted adjacent to said counting mechanism, means pivoted to said pin for contacting with and actuating the counting mechanism when said pivoted means is moved by the work or stock passing through the machine, substantially as set forth.

14. In combination with a sawing-machine, of a shaft mounted thereon, a series of brackets adjustable on said shaft, an arm adjustably mounted on each bracket of the series, a head or support at the end of each arm, counting mechanism seated in the head, a gaging device also carried by said head, and means carried by the gaging device for contacting with the counting mechanism for actuating the latter, substantially as set forth.

15. In a sawing-machine, in combination with a main frame, of a shaft supported thereby, counting mechanisms and gaging devices adjustably mounted on said shaft, such gaging devices comprising a spring-tensioned stud or pin, and a bell-crank-lever cam carried by said stud, and adapted when actuated by the stock passing through the machine to contact with the counting mechanism and operate the latter, substantially as set forth.

16. In combination with a sawing-machine, of a shaft carried thereby, brackets adjustably mounted on said shaft, counting mechanisms carried by said brackets, gaging devices mounted adjacent to said counting mechanisms, said gaging devices comprising each a stud or pin having an enlarged portion and a reduced shank portion, a cam pivoted to said enlarged portion, adapted to contact with the counting mechanism for operating the latter when said cam is actuated by the stock or work passing through the machine, and means for moving said pins vertically independently of any movement on the part of the counting mechanism, said means comprising a key mounted on the main frame, and a flexible connection between said key and the stud or pin, substantially as set forth.

In testimony whereof I have signed my name to this specification in the presence of two subscribing witnesses.

HENRY OSCAR FRY.

Witnesses:
BYRON L. RICE,
ELI HENERY BURDICK.